United States Patent
Rose et al.

(10) Patent No.: US 7,251,730 B2
(45) Date of Patent: Jul. 31, 2007

(54) METHOD AND APPARATUS FOR SIMPLIFIED AUDIO AUTHENTICATION

(75) Inventors: Gregory G. Rose, Concord (AU); Roy Franklin Quick, Jr., San Diego, CA (US); Alexander Gantman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 721 days.

(21) Appl. No.: 10/077,365

(22) Filed: Feb. 15, 2002

(65) Prior Publication Data

US 2003/0120925 A1 Jun. 26, 2003

Related U.S. Application Data

(60) Provisional application No. 60/344,959, filed on Dec. 21, 2001.

(51) Int. Cl.
*H04L 9/00* (2006.01)
(52) U.S. Cl. .................. 713/176; 713/178; 713/170; 726/4; 726/5
(58) Field of Classification Search ........ 713/185–186, 713/155, 176–178, 182, 168–170, 180; 380/277; 705/76, 57; 726/2, 4–5
See application file for complete search history.

(56) References Cited

U.S. PATENT DOCUMENTS

| | | | |
|---|---|---|---|
| 5,422,953 A | 6/1995 | Fischer | 380/23 |
| 5,784,464 A * | 7/1998 | Akiyama et al. | 713/155 |
| 6,213,391 B1 | 4/2001 | Lewis | 235/380 |
| 6,216,231 B1 | 4/2001 | Stubblebine | 713/201 |
| 6,236,724 B1 | 5/2001 | Labaton et al. | 379/355 |
| 6,275,934 B1 * | 8/2001 | Novicov et al. | 713/168 |
| 6,297,795 B1 | 10/2001 | Kato et al. | 345/123 |
| 6,463,537 B1 * | 10/2002 | Tello | 713/182 |
| 6,889,209 B1 * | 5/2005 | Rabin et al. | 705/57 |
| 7,093,131 B1 * | 8/2006 | Kobayashi | 713/176 |
| 7,146,500 B2 * | 12/2006 | Hawkins et al. | 713/176 |
| 2002/0095587 A1 * | 7/2002 | Doyle et al. | 713/186 |

* cited by examiner

*Primary Examiner*—T. B. Truong
(74) *Attorney, Agent, or Firm*—Thomas R. Rouse; Charles D. Brown; Won Tae C. Kim (57) ABSTRACT

An apparatus and method for authentication having a processor and at least one activator coupled to the processor is claimed. A signature generator is coupled to the processor and capable of generating a secure identifier. An emitter coupled to the signal generator capable of emitting the secure identifier. A receiver receives the emitted secure identifier and verifies that the secure identifier was appropriately transmitted. The public key corresponding to the key identifier transmitted is accessed to determine the validity of the secure identifier using the accessed key and that the time indicated in the received secure identifier is verified to be within acceptable time tolerances.

38 Claims, 6 Drawing Sheets

METHOD AND APPARATUS FOR SIMPLIFIED AUDIO AUTHENTICATION

PRIORITY AND RELATED CASES

This application is related to Ser. No. 09/611,569, entitled "Method and Apparatus for Secure Identity Authentication with Audible Tones", filed Jul. 7, 2000, and claims priority to provisional patent application Ser. No. 60/344,959, entitled "Method and Apparatus for Simplified Audio Authentication", filed Dec. 21, 2001. Both applications are incorporated by reference herein.

BACKGROUND

I. Field of the Invention

The present invention pertains generally to the field of electronic security, and more particularly, to authentication of individuals through audio tones.

II. Background

Access to the Internet and use of electronic data systems have grown steadily among the general public. Electronic commerce has been eagerly embraced by both consumers and businesses due to a number of factors, such as the relative ease with which a party can buy or sell to another party without the inherent complications involved in traditional establishments.

However, along with the increase in electronic commerce, the opportunities for fraudulent activity have also increased. Misappropriated identity in the hands of wrongdoers may cause damage to innocent individuals. In worst case scenarios, a wrongdoer may actually purloin a party's identity in order to exploit the creditworthiness and financial accounts of an individual.

In order to prevent unauthorized persons from intercepting private information, various security and encryption schemes have been developed so that private information transmitted between parties is concealed. However, the concealment of private information is only one aspect of the security needed to achieve a high level of consumer confidence in electronic commerce transactions. Another aspect is authentication.

Traditionally, signatures are placed on legal documents to identify the parties involved in the subject matter of the documents and to establish that the parties are in formal agreement. With the advent of electronic commerce transactions, electronic signatures are necessary to formalize the identification of parties and the corresponding agreements between them. The "Electronic Signatures in Global and National Commerce Act" was enacted to give such electronic signatures the same force of law as a penned signature for legal contracts. However, implementation of such secure electronic signatures has been left unresolved by the government.

Accordingly, electronic authentication of an individual may currently be performed by authentication through knowledge, such as a password or a personal identification number (PIN); authentication through personal characteristics (biometrics), such as a fingerprint, DNA, or a signature. With current reliance on electronic security measures, it is not uncommon for an individual to carry multiple authentication objects or be forced to remember multiple passwords. For example, an individual may perhaps need a PIN for an ATM machine, a password to log onto a computer, a second password to access an internet service provider at home, multiple passwords to access various internet pages, a proximity card to gain access to secured buildings or structures, or a garage door opener to gain entry into a house.

Authentication through knowledge is thus problematic for individuals who are forced to remember multiple passwords or PINs. Also, passwords that are the easiest for a person to recall are the passwords that are the easiest for another person to guess. Further, security may be compromised as people may write down such information because the amount of information needed to be retained is voluminous. Writing down such information leaves an individual vulnerable to the theft of passwords or PIN codes.

Authentication through portable objects and personal characteristics may also be problematic for an average customer due to the highly specialized input devices that are required to retrieve authentication information. For example, ATM cards require an ATM machine and smart cards require a smart card reader.

Accordingly, current methods utilizing physical objects and personal characteristics are inadequate for a person who must be authenticated through a data connection or across a telephone line. In addition, having to remember passwords or carry multiple physical objects is cumbersome to the individual. Therefore, there is a present need to simplify and increase the security of the process of authenticating an individual.

SUMMARY

An apparatus that may be used by an individual to securely identify oneself by emitting a secure identifier is disclosed. The identification and authentication process is one-way; that is, the individual transmits a secure identifier, the receiver then authenticates the secure identifier, and permits access. The secure identifier comprises a digital signature, a time element, and a key identifier. The apparatus comprises a processor, at least one actuator coupled to the processor, a clock capable of generating the time element, a memory element configurable to store the private key and public key information (such as the key identifier), a signature generator coupled to the processor operable to generate a digital signature, and an emitter coupled to the signal generator operable to emit the secure identifier. In an aspect of an embodiment, multiple digital signatures using multiple cryptographic keys may be stored or generated by a storage element and utilizing the processor.

A process that the apparatus undergoes to transmit a secure identifier comprises generating a time element, selecting a key identifier, generating a random number, generating a digital signature as a function of a private key, the time element, and the random number; and emitting the data packet.

An apparatus that may be used to receive an authentication message comprises a receiver configurable to receive a secure identifier. The secure identifier comprises a public key identifier, a time identifier, and a digital signature. The apparatus further comprises a verifier configurable to verify the secure identifier. The verifier comprises memory comprising at least one public key and information relating to time tolerances and access privileges, a key retriever configurable to retrieve the public key and access privileges associated with the public key, a time verifier configurable to verify that the received time identifier falls within the time tolerances, and a digital signature verifier. The digital signature verifier determines the authenticity of the digital signature as a function of the digital signature, the public key, and the time identifier. The digital signature may further be encrypted with a PIN where the receiver decrypts the digital signature using PIN information accessed in association with the public key.

A process undergone to receive a secure identifier comprises receiving a secure identifier, the secure identifier comprising a digital signature, a public key identifier and a time identifier, and verifying the validity of the secure identifier.

In another aspect, the apparatus may further comprise a key selector to select the particular key within the device.

In another aspect, it is an advantage to provide an authentication device and method that only requires communication in one direction.

In another aspect, the apparatus and method may encrypt a digital signature using a personal identification number (PIN).

In another aspect, the transmitting device minimizes the information sent to the receiving device so that authentication may occur more quickly.

In another aspect, a sequence reference is included in the secure identifier to prevent replaying of the same secure identifier.

In another aspect, the apparatus and method may create public and private keys internally within the authentication device.

In another aspect, the apparatus and method provides for authentication without the use of the public key infrastructure.

BRIEF DESCRIPTION OF THE DRAWINGS

The features, objects, and advantages of the invention will become more apparent from the detailed description set forth below when taken in conjunction with the drawings in which like reference characters are identified correspondingly throughout and wherein.

DETAILED DESCRIPTION OF THE PREFERRED EMBODIMENTS

An authentication device may be used to verify the identity of an individual to allow transactions between the individual and various external devices. In particular, the authentication process is one-way; that is, the individual transmits a secure identifier, the receiver then authenticates the secure identifier, and permits access. Physical possession and operation of the authentication device provides one aspect of the required verification, in much the same manner that the physical possession of a key allows an individual to gain access through a locked door. Optionally, for more secure applications, the authentication device may be combined with an application-specific password or personal identification number (PIN).

The authentication device may be small enough to attach to a key ring. Alternatively, the authentication device may be embedded into another device, such as a wireless phone or a personal data assistant (PDA). In one mode of operation, the user may hold the authentication device near a receiver, or an input device. Actuating the device, such as pressing a button, activates the authentication device, thereby emitting a short signal that identifies the token in a cryptographically secure manner. The signal encodes a cryptographically secure message, or a secure identifier, and preferably uses public key technology, although the public key infrastructure may also be bypassed. The secure identifier may include a representation of the time. Receipt and verification of the secure identifier proves that the signal was sent by the token. Checking the time encoded within the secure identifier to be within reasonable limits of the time as known in the receiver provides evidence that the audio signal simply is not a replay of a recorded signal at a later time.

One method for generating digital signatures is public-key cryptography. In a public-key cryptography scheme, a user has both a private key for signing and a public key for verification. The user signs a communication with the user's private key and sends the secure identifier with the communication to a targeted party, which then verifies the communication with the user's public key. The fact that the targeted party is able to verify the communication with the user's public key is the electronic signature that authenticates the communication as originating from the user. It should be noted that use of a public-key cryptography scheme is illustrative only and the exemplary embodiments may incorporate other proof of knowledge schemes.

In another non-limiting exemplary embodiment, the public key infrastructure is bypassed. A one-time meeting to identify the individual who wishes to gain access occurs. In an example of security to allow a person to access buildings, an individual would go to a security office and satisfy the security office of his or her identity. Upon satisfaction of the individual's identity, the individual activates her personal security device, which causes the device to transmit the public key information corresponding to the private information contained within her personal security device. The public key information is received by the security office and recorded and stored.

In operation, when the individual attempts to gain entry, the individual activates the security device, thereby transmitting the secure identifier towards a receiving device, which in turn verifies that the transmitted signal received is verified using the public key which was recorded and stored in the security office. Access information and privileges information may be stored in association with the public key. In an embodiment, the receiver is coupled to a security database that uses a short identifier such as a database index. A time stamp in the secure identifier transmitted further verifies that the transmission signature falls within acceptable time limits as received, thereby allowing entry. Moreover, the secure identifier may be verified such that the time indicated is later than the last time the signature was used. This prevents the replay of the same signature, even if just a short time later. In an embodiment, the time tolerances are predetermined. Upon verification, access is allowed. Accordingly, a transmitted secure identifier is authenticated using one-way communication.

It should be noted that in situations where greater anonymity is desirable, the individual may provide another secure identifier to a receiving device, one which does not have her name corresponding to the secure identifier transmitted. For example, a second secure identifier may be generated, using a key that was initially set-up not to include the name of the individual.

In another mode of operation, which may be more applicable for higher security applications, the user may also be required to enter a personal identification number (PIN) code. As such, use of the PIN acts as a first unlocking of a device. In addition, a PIN code may also be entered directly into the receiving or verifying device, such as that found in an ATM machine. Further, it is contemplated that a user may have different PINs for different applications, such that even if the PIN code was discovered for one application, the same PIN code may not allow access to other devices. The PIN code may be entered either before or after the audio signal is transmitted, and may be entered either to the device generating the signal, or to the device receiving the signal.

In another higher security mode of operation, the verifier, or receiver, conveys to the user a challenge to be signed together with the time element. The challenge is preferably random, and therefore likely to be unique for each occurrence. For example, the receiver may have a display asking the user to input a series of numbers (challenge) into the authenticating device. The user then enters the challenge into the authenticating device and activates it to sign the challenge, together with the time element. Thus, the digital signature of the challenge, together with the time element, provides greater protection against replay attacks. For example, replaying a recorded message to a verifier, even within acceptable time tolerances, will not succeed as long as the verifier chooses a different challenge.

In an embodiment, the authentication device comprises a single actuator. In alternate embodiments, multiple actuators may be present on the device to select different internal cryptographic keys or provide other user interfaces. When activated, an authentication signal is emitted. Information that may be encoded in the signal includes a key identifier. A key identifier may have a device serial number and a predetermined quantity of the bits selecting the particular key within the device, or the key identifier may be a hash of the public key. Other information that may be encoded includes a predetermined quantity of bits representing the time as represented in the device. In another embodiment, the least significant bits of the time in the device are utilized.

The receiving device demodulates and verifies the signal (including verifying the signature and verifying the time). The authentication receiver has pre-stored a record of the public key corresponding to the secret key in the device, among other information, in particular, information about the amount of acceptable clock drift, the last known drift, might be stored and taken into account. The record may also include attributes associated with the public key, such as the access privileges associated with that particular public key. Access privileges may be information such as, but not limited to, when and where a particular public key may be used. Access privileges may also include which devices the public key may have access to. Using information regarding clock drift and the least significant bits of the current time, the authentication server would determine the time that the digital signature applies to, and thus may verify the signature to allow access.

Alternatively, the receiving device may demodulate the signal and transmit the signal to a verifier located elsewhere. For example, a centralized verifier may receive the signals, in digital or analog form, and conduct the verification process. The centralized verifier may comprise a central, backend database containing information needed to verify received signatures and associated privilege information. Upon verification, the centralized verifier sends the necessary information to the authentication receiver. Thus, the demodulation of the received secure identifier and the verification of the signature may occur in two places—either in the receiving device or in the centralized verifier/database.

In another embodiment, the authentication device is provisioned with more than one key and may have the ability to create additional keys internally. In such embodiments, an internal random number generator is used to create keys within the authentication device.

Figure 1A:
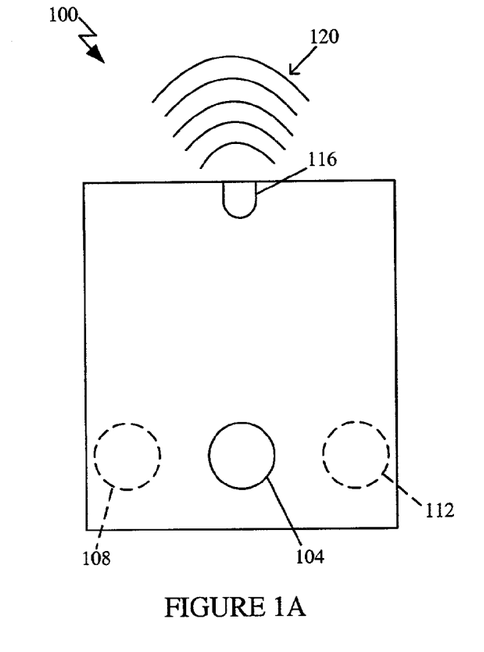
FIG. 1A is a block diagram of a physical implementation of an audio authentication device.

FIG. 1A illustrates a block diagram of a physical implementation of an authentication device 100. The device 100 comprises an activator or actuator 104. Optionally, additional actuators 108 and 112 may also be used. Additional actuators 108 and 112 may be used to activate different keys, which in turn, authenticate different applications. The actuators 104, 108 and 112 may be any type of switch, such as a push-button switch, a toggle switch, a dial, or a voice activated switch. An emitter 116 emits an audio authentication signal or secure identifier 120. The secure identifier 120 comprises a digital signature, an identifier of the public key to gain access to a particular device, along with other information, such as the current time. In an embodiment, a predetermined number of bits represent the time. In another embodiment, a predetermined number of least significant bits represent the time. In so doing, receipt and verification of the secure identifier 120 is evidence that secure identifier 120 was sent by the authentication device 100. Further, a check of the time encoded in the secure identifier against the current time verifies that the time encoded is within reasonable limits of the current time. The digital signature is a function of the private key, and preferably of the key identifier, along with a random number. The private key corresponds to the specified public key. If the secure identifier 120 is being transmitted in response to a challenge, the digital signature is a function of the challenge.

Figure 1B:
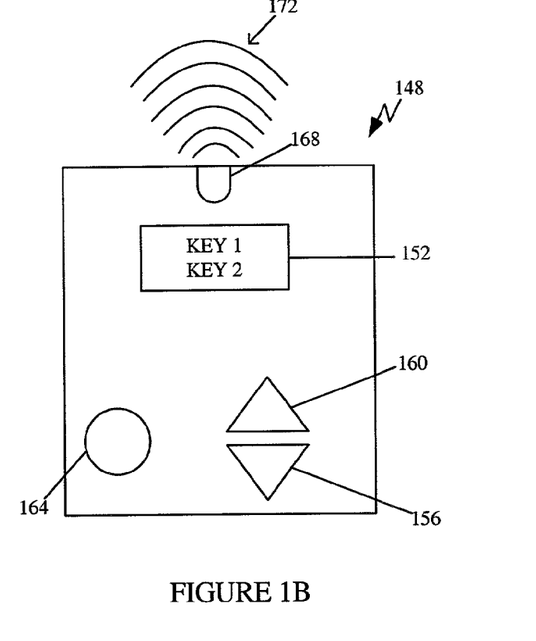
FIG. 1B is a block diagram of another physical implementation of an audio authentication device.
Figure 1C:
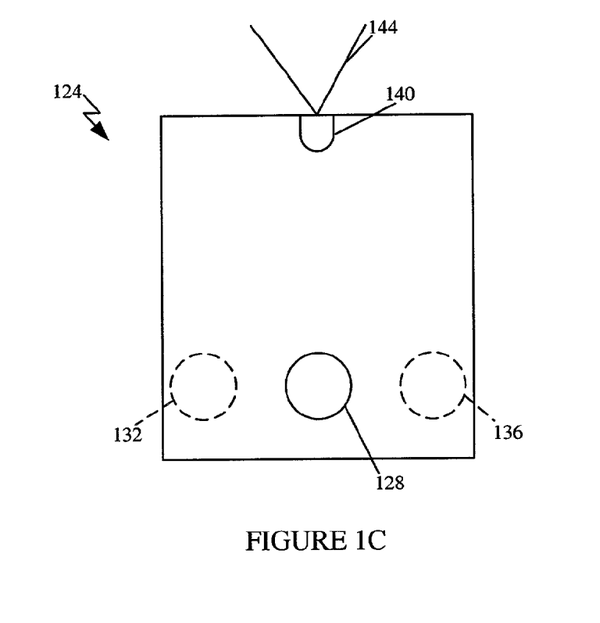
FIG. 1C is a block diagram of a physical implementation of an optical authentication device.

FIG. 1C illustrates a block diagram of an alternate physical implementation of an authentication device 124. An actuator 128, and optionally additional actuators 132 and 136, allow a user to select a particular key. An emitter 140 emits an optical authentication signal or secure identifier144.

In yet another embodiment, FIG. 1B illustrates a physical implementation of another authentication device 148. A display 152 displays to the user the different keys that are selectable. Selector keys 156 and 160 allow the user to scroll and identify the various keys available. An actuator 164 allows the user to select the desired key to be emitted through an emitter 168. The emitted secure identifier 172 is in the form of an audio secure identifier or an optical secure identifier, is then emitted to a receiving device for authentication.

Figure 1D:
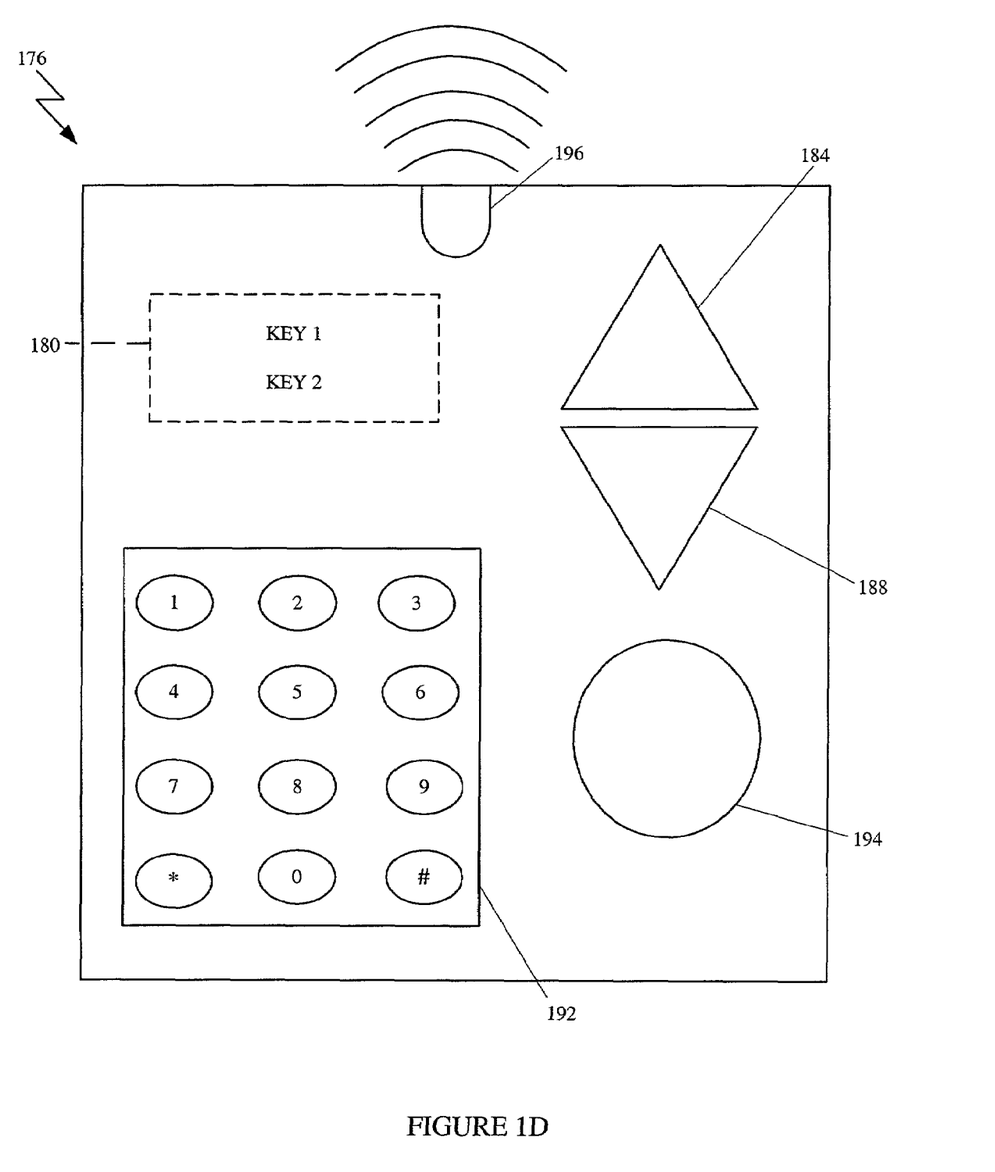
FIG. 1D is a block diagram of a physical implementation of an authentication device.

FIG. 1D illustrates another embodiment of a physical implementation of an authentication device 176. Similar to the embodiment as illustrated in FIG. 1B, display 180, along with selectors 184 and 188, allow a user to scroll through and identify various keys. A user input device, such as keypad 192, allows a user to input a personal identification number (PIN) in addition to the digital signature. An actuator 194 selects and sends the selected key in the form of an encrypted secure identifier through the emitter 196.

As used herein, a digital signature is a randomized function of the signer's private key and the message being signed. That is, a digital signature is a function of the signer's private key, the message being signed, and a random number. In one embodiment, a message is signed using the signer's private key. In this embodiment, the message being signed is usually the time identifier, although other information may be used. In an alternate embodiment of a challenge-response scenario, the message being signed is the challenge that the user has typed in (possibly together with the time identifier). Thus, in order to verify a digital signature, one needs the signer's public key, the signature to be verified, and the message that was signed. Thus, the "secure identifier" that the token sends to the verifier contains the information necessary for verification: public key identifier (the key itself should be known to the verifier already), the message (i.e. the time identifier), and the signature.

In a non-limiting exemplary embodiment, audio tones are used to uniquely represent the cryptographic signatures stored on or generated by the authentication device. Many devices, such as desktop and laptop computers currently integrate or may be accessorized with the capability to generate or receive audio tones. Other electronic devices, such as personal data assistants (PDAs), mobile phones, pagers, and alarm systems may also be used with the exemplary embodiments with the proper accessories. In addition, other communication methods such as telephone networks, radio networks, intercom systems, Bluetooth™, other wireless means and other RF communication systems may be utilized. Accordingly, a user may use exemplary embodiments to identify him/herself directly in face-to-face transactions or indirectly through communication media.

In another non-limiting embodiment, optical signals are used to uniquely represent cryptographic signatures stored on or generated by the authentication device. Similar with respect to audio tones, many devices may be equipped or accessorized with the capability to generate or receive wireless signals, such as infrared, radio frequency, and optical signals.

Figure 2:
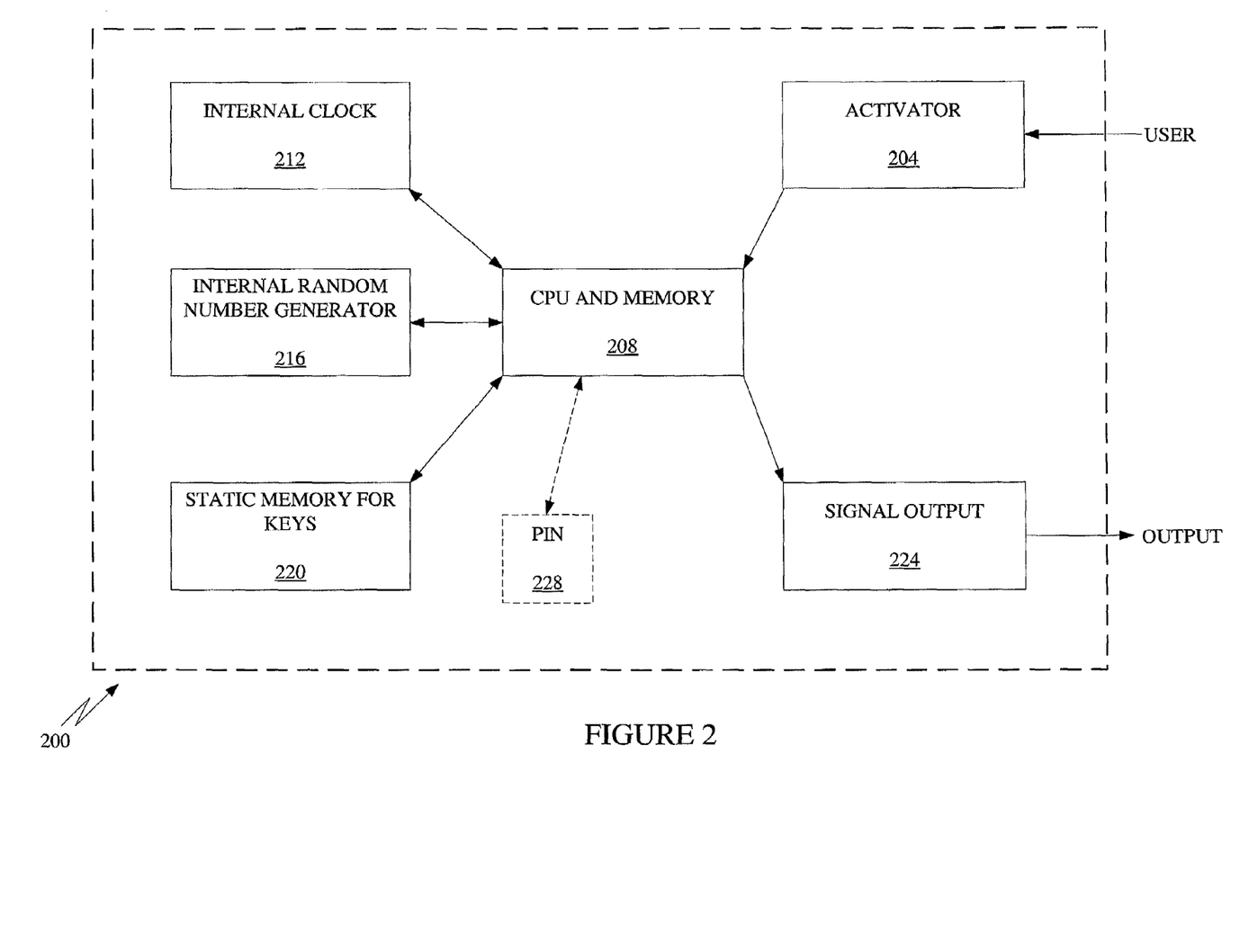
FIG. 2 is a block diagram of a transmitting authentication device.

FIG. 2 illustrates a block diagram of the internal operations of an authentication device 200. An actuator 204 is coupled to a central processing unit (CPU) or processor and associated memory 208. The actuator 204 may be any type of user-enabled actuator, such as a toggle switch, a push-button switch, or voice-activated switch. The processor and memory 208 is coupled to an internal clock 212, a random number generator 216, and, optionally, additional static memory 220. Alternatively, random number generator 216 may be a pseudo-random number generator, based on a pre-loaded random seed. The clock 212 generates the time. Although the clock need not identify the current time, the time does have to be consistent with the receiver of the authentication signal. Also, the clock may have a separate supplemental or back-up power supply, such as a battery (not shown). That is, the time represented in the transmitting device and the receiving device need to advance at the same rate, but they may be offset from one another. Static memory 220 may be used for the storage of key identifiers and other information. Static memory is also useful when the power source (such as a battery) needs to be replaced. Of course, memory 208 may also be used for such storage.

Different key identifiers may be used to identify the user to allow for different transactions. For example, one key may be used for a bank to allow for transactions, another key may be specific to gain entry into car doors, another key for office doors, and so on. Similarly, the same key identifier may be used for different transactions. Accordingly, the same key may be used to gain entry into specific office doors, car doors, a phone or a computer. The key identifiers that may be stored in memory 220 may include information, such as the device serial number and, potentially, a number of bits indicative of the particular key within the device.

Optionally, the device 200 may comprise an input device 228 capable of receiving a personal identification number (PIN). The PIN may be used in transactions where there is a perceived need for a greater level of security. The processor 208 generates a data packet, combining a predetermined number of bits representing the time, along with the appropriate key identifier, and generates an encrypted digital signature. The secure identifier is then output through an emitter, such as emitter 224. If the secure identifier is an audio secure identifier, the authentication device may be positioned proximate to an audio input device such that the receiver receives the audio secure identifier. Similarly, if the secure identifier is an optical secure identifier, the authentication device may be positioned proximate to an optical input device such that the receiver receives the optical secure identifier. It should be noted that the authentication device need not be proximate to the receiver. For example, in an example of using a telephone, the secure identifier is transmitted through emitter 224 into a phone transmission system (wired or wireless), to be received by a remote receiver.

In another embodiment, the PIN is entered directly into the receiving device, such as the case of an automated teller machine (ATM). In such a case, the PIN may be used to encrypt the signature part of the transmitted data (as opposed to the time stamp or the identifier). In another embodiment, the PIN is again input directly into the receiving device.

Figure 3:
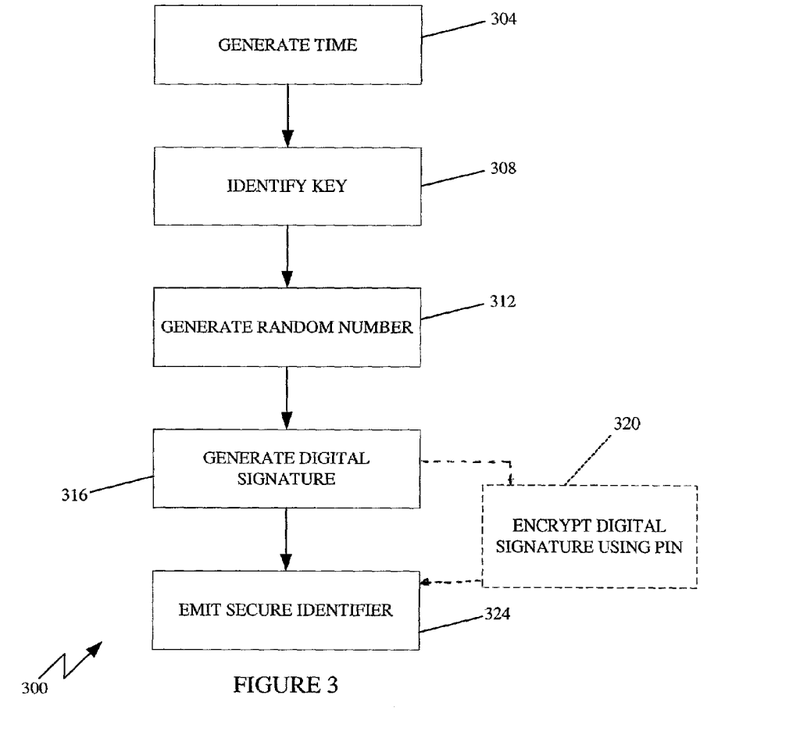
FIG. 3 is a flow chart of an authentication procedure.

FIG. 3 illustrates a flowchart of the operation of an authentication device described with respect to FIG. 2. The time is generated 304. The particular key needed for a given operation is identified 308. A random number 312 is generated. A processor, such as the processor 208 of FIG. 2, generates a digital signature 316 using the current time (time identifier), the identified private key, and the generated random number. Optionally, the digital signature generated is encrypted using the user-inputted PIN. The digital signature 316, coupled with the time identifier and a public key identifier, collectively called the secure identifier, is then emitted 324. It should be noted that the above steps may occur in any order.

Figure 4:
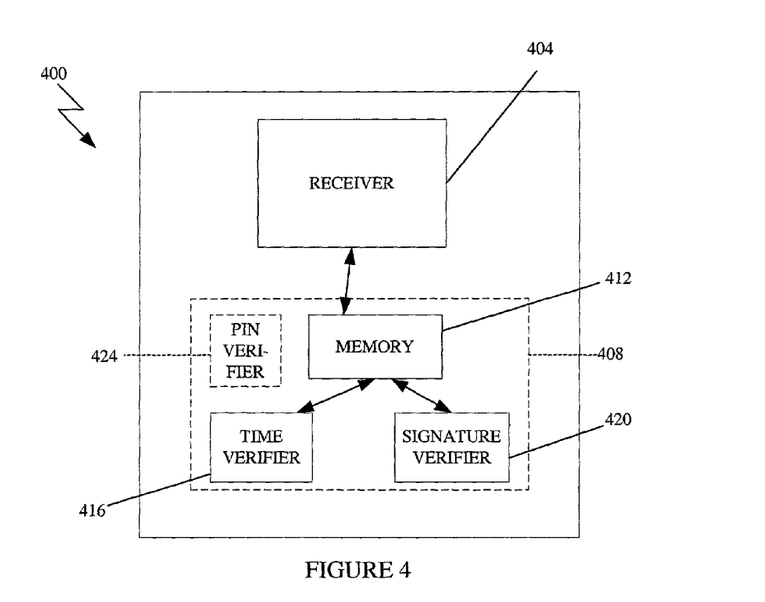
FIG. 4 is a block diagram of a receiving authentication device.

FIG. 4 illustrates a device that receives the secure identifier 400. A receiver 404 receives the emitted signal from the authentication device and demodulates the signal. The data is then forwarded to a verifier 408. The verifier 408 comprises memory 412, a time verifier 416, and a signature verifier 420. The memory 412 contains a record of the public key corresponding to the secret key in the device, and other information. In particular, information regarding the amount of acceptable clock drift, the last known drift, and other time-related information may be stored and taken into account. Also, access and privileges information is stored in association with the public key. Thus, the time verifier 416 compares the time as received from the secure identifier with a predetermined time window of acceptance, also taking into account such clock drift information. If the time as received falls within acceptable time constraints, the time component of the secure identifier is verified. The public key corresponding to the public key identifier is also retrieved.

The signature verifier 420 preferable contains a processor and verifies that the signature generated by the private key corresponds to the stored public key. Optionally, a PIN verifier 424 verifies that the appropriate PIN was used, by decrypting the digital signature received as a function of the PIN. If the verification process is successfully completed, access to the device is allowed. No signal from the receiving device 400 needs to be sent to the emitting device in order for access to be allowed.

Figure 5:
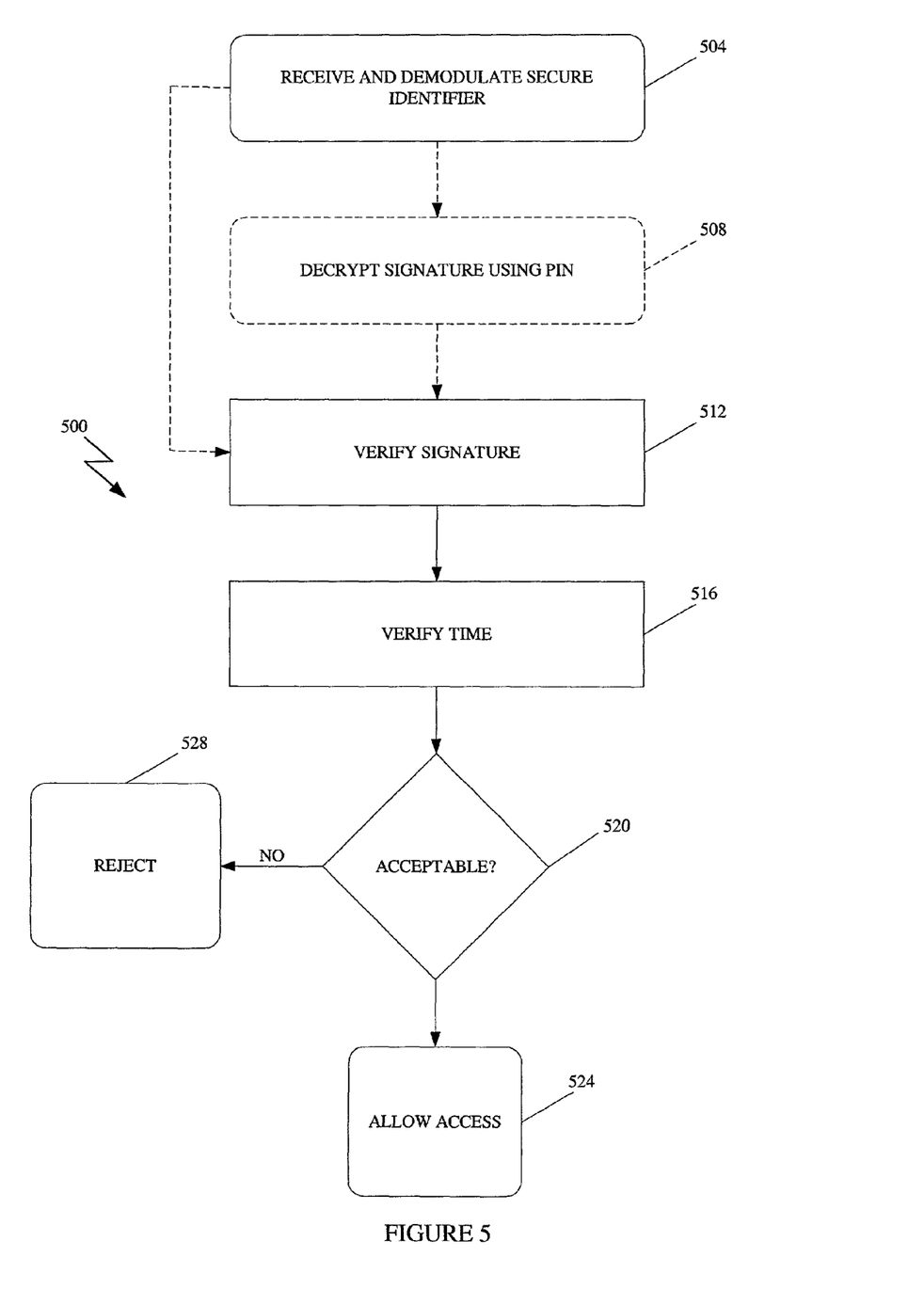
FIG. 5 is a block diagram of a receiving authentication procedure.

FIG. 5 illustrates a flowchart of the process undergone by a device as described with respect to FIG. 4. A secure identifier is received and demodulated 504. Optionally, the secure identifier is decrypted using the PIN 508. Step 512 verifies the digital signature. The public key corresponding to the public key identifier transmitted is accessed to determine the validity of the secure identifier using the accessed key. Step 516 verifies the time. The time indicated in the received secure identifier is verified to be within acceptable time tolerances as predetermined in the receiving device (or centralized verifier). If the signature, the time information and, optionally, the PIN information 520 is acceptable, access is allowed 524. Otherwise, the access requested is rejected 528. Note that, in the absence of the correct public key with which to verify the signature, a signature itself appears to be random data, and so an adversary who intercepted this could not verify guesses about the correct PIN, even though the link itself is not secure.

Figure 6:
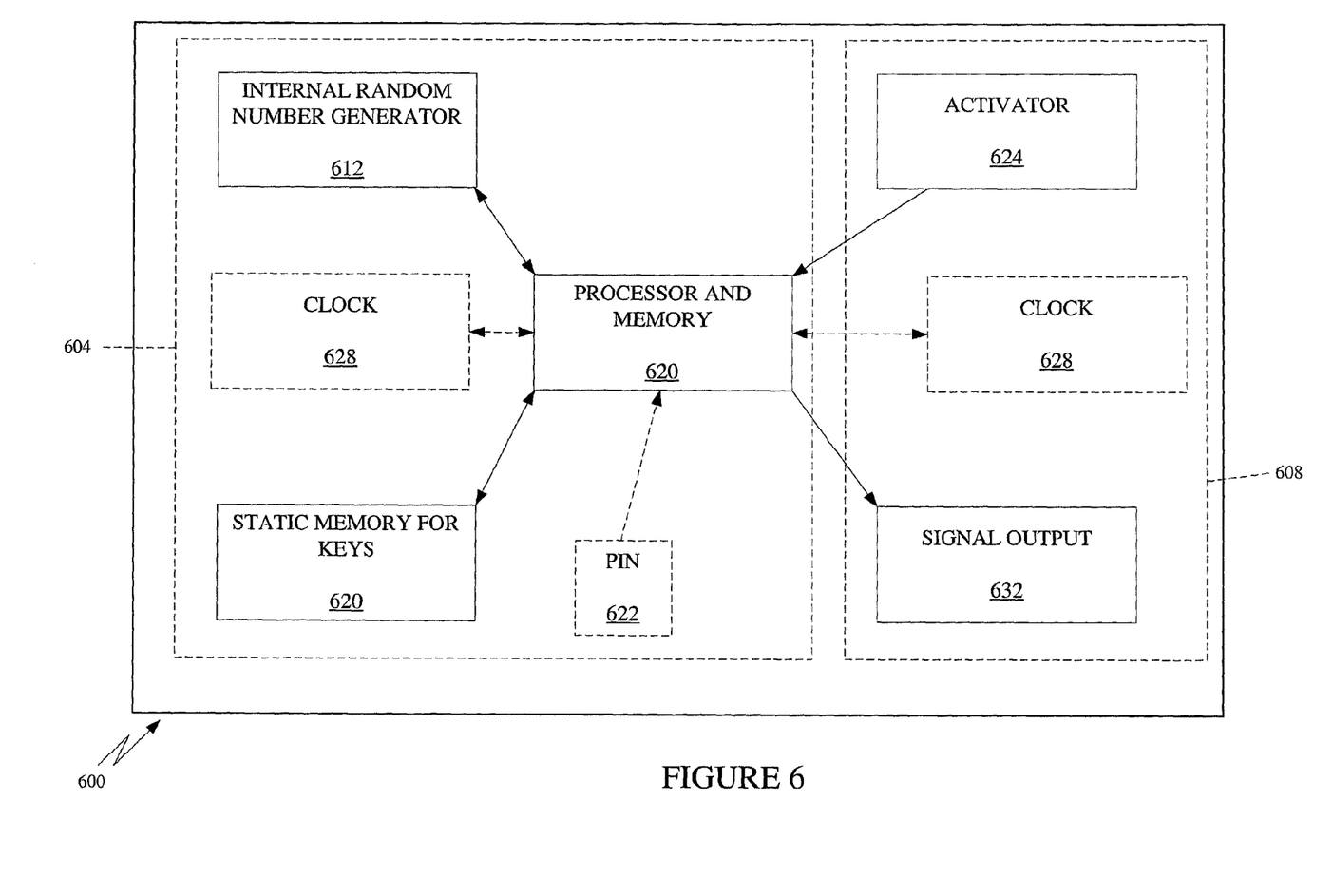
FIG. 6 is a block diagram of an authentication device integrated into a wireless phone.

In another embodiment, the device may operate through a secure co-processor, such as a smart card or a Subscriber Identity Module (SIM card). In the non-limiting example of a SIM card and a wireless phone, the SIM card is inserted into a wireless phone 600, as illustrated in FIG. 6. The SIM card is the secure portion 604 and the remainder of the phone is the non-secure portion 608. Similar to the embodiment described in FIG. 2, the SIM card houses an internal random number generator 612, memory for keys 616, a processor (and memory) 620 and, optionally, PIN module 622. The device takes advantage of inherent components in the wireless phone, such as an activator 624, a clock 628 and a signal output or transmitter 632. Alternatively, the clock 628 may reside within secure portion 604. In the situation where the clock 628 resides outside the secure portion 604, for example, a wireless code division multiple access (CDMA) handset may derive its time component from the network. Thus, compromising of network time, or emulating network time to compromise the security of the handset (i.e., fool the handset), is more difficult.

It should be noted that the exemplary embodiments may be implemented whenever a database for storing information pertaining to the authentication process exists at the receiving end, or is accessible by the receiving end. The processor of the exemplary embodiments may be used to implement one cryptographic scheme with one party and another cryptographic scheme with another party. The basic implementation of the exemplary embodiments may be performed without the need for physical connection to intermediary resources because communication with separate parties occur through a wireless medium.

Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality,. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, flowcharts, windows, and steps described in connection with the embodiments disclosed herein may be implemented or performed in hardware or software with an application-specific integrated circuit (ASIC), a programmable logic device, discrete gate or transistor logic, discrete hardware components, such as, e.g., registers in the FIFO, a processor executing a set of firmware instructions, any conventional programmable software and a processor, a field programmable gate array (FPGA) or other programmable logic device, or any combination thereof. The processor may advantageously be a micro-controller, but in the alternative, the processor may be any conventional processor, controller, micro-controller, or state machine. The software may reside in RAM memory, flash memory, ROM memory, EPROM memory, EEPROM memory, hard disk, removable disks, a CD-ROM, a DVD-ROM, registers, or any other magnetic or optical storage media. Those of skill of the art would further appreciate that the data, instructions, commands, information, signals, bits, symbols, and chips that may be referenced throughout the above description are advantageously represented by voltages, currents, electromagnetic waves, magnetic field or particles, optical fields or particles, or any combination thereof.

The previous description of the preferred embodiments is provided to enable any persons skilled in the art to make or use the present invention. Various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What we claim as our invention is:

1. An authentication apparatus operable to produce a secure identifier, the apparatus comprising:
    a processor;
    a clock coupled to the processor configurable to generate a time element;
    a memory element coupled to the processor configurable to store a private key and public key information, the private key associated with a user;
    at least one actuator coupled to the processor, the actuator configured to activate the private key;
    a signature generator coupled to the processor operable to generate a digital signature when the actuator is activated, the digital signature being a function of the private key and the time element; and
    an emitter coupled to the signature generator operable to emit the secure identifier to authenticate the user to an external authentication receiver, the secure identifier comprising the digital signature, time element, and public key information.

2. The apparatus set forth in claim 1, the signature generator further comprising:
    a random number generator coupled to the processor to encrypt the digital signature.

3. The apparatus set forth in claim 1, wherein the time element comprises a predetermined number of least significant bits of the time.

4. The apparatus set forth in claim 1, further comprising an input element coupled to the processor, the input element capable of receiving a personal identification number (PIN).

5. The apparatus set forth in claim 1, further comprising an input element coupled to the processor, the input element capable of receiving a challenge.

6. The apparatus set forth in claim 1, further comprising a display coupled to the processor, the display capable of displaying key identifiers.

7. The apparatus set forth in claim 1, wherein the secure identifier emitted is emitted as an audio tone.

8. The apparatus set forth in claim 1, wherein the secure identifier emitted is emitted as an optical signal.

9. The apparatus set forth in claim 1, wherein the actuator is a push-button switch.

10. The apparatus set forth in claim 1, wherein the actuator is a voice activated switch.

11. Tile apparatus set forth in claim 1, wherein the public key information is a public key identifier.

12. The apparatus set forth in claim 11, wherein the pubic key identifier is derived from the public key information.

13. The apparatus set forth in claim 1, wherein the public key information is the public key.

14. The apparatus set forth in claim 1, wherein the digital signature is encrypted using a personal identification number (PIN).

15. A method of authenticating, comprising;
generating a time element;
identifying a key identifier, the key identifier associated with a user;
generating a digital signature;
generating a secure identifier as a function of the time element, the key identifier, the digital signature; and
emitting the secure identifier to authenticate the user to an external authentication receiver.

16. The method set forth in claim 15, further comprising identifying a PIN, and wherein generating a digital signature is further a function of the PIN.

17. The method set forth in claim 15, wherein the secure identifier emitted is emitted as an audible tone.

18. The method set forth in claim 15, wherein the time element, digital signature, and secure identifier are generated on a mobile user device.

19. The method set forth in claim 15, wherein the digital signature is derived from a private key.

20. An authentication receiver, comprising:
a receiver configurable to receive a secure identifier for authentication of a sender, the secure identifier comprising:
a digital signature, the digital signature comprising information derived from a private key,
a public key identifier corresponding to a public key associated with the sender being authenticated; and
a time identifier; and
a verifier configurable to verify the secure identifier, the verifier comprising:
memory comprising information corresponding to the public key information received and time tolerance information;
a key retriever coupled to the memory and configurable to retrieve the pubic key corresponding to the public key identifier; and
a time verifier coupled to the memory and configurable to verify that the received time identifier falls within acceptable time tolerances.

21. The apparatus set forth in claim 20, die secure identifier further comprises a PIN, and wherein the receiver is configurable to decrypt the digital signature using the PIN.

22. The apparatus set forth in claim 20, wherein the key retriever compares the public key identifier received to public key information stored in memory.

23. The apparatus set forth in claim 20, wherein the time tolerance information comprises information regarding clock drift.

24. The apparatus set forth in claim 20, wherein the secure identifier is emitted as an audible tone.

25. The apparatus set forth in claim 20, wherein the secure identifier is emitted as an optical signal.

26. A method of authenticating, comprising:
receiving a secure identifier for authentication of a sender, the secure identifier comprising a digital signature, a public key identifier, and a time identifier, wherein the public key identifier corresponds to a public key associated with the sender being authenticated; and
verifying the secure identifier, verifying comprising:
verifying that the public key identifier received corresponds to known information regarding the public key identifier received; and
verifying the time identifier such that the time identifier received is within predetermined time tolerances.

27. The method set forth in claim 26, the digital signature further comprises a PIN, and where receiving further comprises decrypting at least a portion of the digital signature using the PIN.

28. The method set forth in claim 26, wherein the secure identifier received is received as an audible tone.

29. The method set forth in claim 26, wherein the secure identifier received is received as an optical signal.

30. Apparatus for authenticating, comprising:
means for generating a tune element;
means for identifying a key identifier, the key identifier associated with a user;
means for generating a digital signature;
means for generating a secure identifier as a function of the time element, the key identifier, the digital signature; and
means toy emitting the secure identifier to authenticate the user to an external authentication means.

31. The apparatus set forth in claim 30, further comprising means for identifying a PIN, and wherein means for generating a digital signature is further a function of the PIN.

32. The apparatus set forth in claim 30, wherein the secure identifier emitted is emitted as an audible tone.

33. The apparatus set forth in claim 30, wherein the secure identifier emitted is emitted as an optical signal.

34. The apparatus set font in claim 30, wherein the digital signature is derived from a private key.

35. Apparatus for authenticating, comprising:
means for receiving a secure identifier for authentication of a sender, the secure identifier comprising a digital signature, a public key identifier, and a time identifier, wherein the public key identifier corresponds to a public key associated with the sender being authenticated; and
means for verifying the secure identifier, the means for verifying comprising:
means for verifying that the public key identifier received corresponds to known information regarding the public key identifier received; and
means for verifying the time identifier such that the time identifier received is within predetermined time tolerances.

36. The apparatus set forth in claim 35, the digital signature further comprises a PEN, and where means for receiving further comprises decrypting the digital signature using the PIN.

37. The apparatus set forth in claim 35, wherein the secure identifier received is received as an audible tone.

38. The apparatus set forth in claim 35, wherein the secure identifier received is received as an optical signal.

* * * * *